(12) United States Patent
Yang et al.

(10) Patent No.: US 12,536,414 B2
(45) Date of Patent: Jan. 27, 2026

(54) NOTIFICATION MANAGEMENT AND CHANNEL SELECTION

(71) Applicant: Microsoft Technology Licensing, LLC, Redmond, WA (US)

(72) Inventors: Guangyu Yang, Sunnyvale, CA (US); Wensheng Sun, Sunnyvale, CA (US); Jiaxi Xu, Santa Clara, CA (US); Xianen Qiu, Sunnyvale, CA (US); Yiping Yuan, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 889 days.

(21) Appl. No.: 17/847,886

(22) Filed: Jun. 23, 2022

(65) Prior Publication Data

US 2023/0419084 A1    Dec. 28, 2023

(51) Int. Cl.
*G06N 3/04* (2023.01)
*G06N 3/045* (2023.01)
*G06N 3/047* (2023.01)
*G06N 3/08* (2023.01)

(52) U.S. Cl.
CPC ............. *G06N 3/047* (2023.01); *G06N 3/045* (2023.01); *G06N 3/08* (2013.01)

(58) Field of Classification Search
CPC ................................ G06N 3/045; G06N 3/047
See application file for complete search history.

(56) References Cited

U.S. PATENT DOCUMENTS

| | | | |
|---|---|---|---|
| 9,805,391 B2 | 10/2017 | Agarwal | |
| 10,728,201 B2 * | 7/2020 | Ratiu | H04L 67/535 |
| 12,020,690 B1 * | 6/2024 | Gamzu | G06N 3/045 |
| 2012/0066087 A1 | 3/2012 | Zhang | |

(Continued)

OTHER PUBLICATIONS

Bennis, Achraf, Sandrine Mouysset, and Mathieu Serrurier. "Estimation of conditional mixture Weibull distribution with right censored data using neural network for time-to-event analysis." Advances in Knowledge Discovery and Data Mining: 24th Pacific-Asia Conference, May 11-14, 2020 (Year: 2020).*

(Continued)

*Primary Examiner* — Hal Schnee
(74) *Attorney, Agent, or Firm* — Cantor Colburn LLP; Renee D. Brown

(57) ABSTRACT

Methods, systems, and computer programs are presented for predicting a response probability to a sent notification. One method includes an operation for training respective neural networks to obtain a first, second, and third models. The first model generates an embedding based on member information. The second and third model generate parameters for a distribution function. The first model is used to calculate a member embedding when accessing a notification for a member. Further, the method second model calculates a first parameter value, and the third model calculates a second parameter value based on the member embedding. Further, the method determines, a first probability that the member will visit the online service in response to the notification and a second probability that the member will visit without sending the notification. The method further includes determining to send the notification based on the first probability and the second probability.

20 Claims, 10 Drawing Sheets

(56) References Cited

U.S. PATENT DOCUMENTS

| | | |
|---|---|---|
| 2014/0164385 A1 | 6/2014 | Liu et al. |
| 2016/0267520 A1 | 9/2016 | Kalish et al. |
| 2018/0081978 A1 | 3/2018 | Lv |
| 2019/0066149 A1 | 2/2019 | Strong et al. |
| 2019/0188594 A1 | 6/2019 | Yuan et al. |
| 2022/0051017 A1* | 2/2022 | Choi ............ G06V 10/764 |

OTHER PUBLICATIONS

Pradhan, Swadhin, et al. "Understanding and managing notifications." IEEE infocom 2017—ieee conference on computer communications. IEEE, 2017. (Year: 2017).*

Chen, Charles, et al. "Predictive analysis by leveraging temporal user behavior and user embeddings." Proceedings of the 27th ACM International Conference on Information and Knowledge Management. 2018. (Year: 2018).*

U.S. Appl. No. 15/884,527, filed Jan. 31, 2018.

"Exponential Distribution", Retrieved from: https://en.wikipedia.org/wiki/Exponential_distribution, May 9, 2022, 16 Pages.

"Exponential Family", Retrieved from: https://en.wikipedia.org/wiki/Exponential_family, May 18, 2022, 17 Pages.

"Log-Normal Distribution", Retrieved from: https://en.wikipedia.org/wiki/Log-normal_distribution, May 23, 2022, 22 Pages.

"Survival Analysis", Retrieved from: https://en.wikipedia.org/wiki/Survival_analysis#:~:text=More%20generally%2C%20survival%20analysis%20involves,mechanism%20is%20dead%20or%20broken, Dec. 31, 2021, 15 Pages.

"Classification and Regression", Retrieved from: https://spark.apache.org/docs/latest/ml-classification-regression.html#survival-regression, Retrieved on: May 27, 2022, 22 Pages.

"TensorFlow Probability is a Library for Probabilistic Reasoning and Statistical Analysis", Retrieved from: https://www.tensorflow.org/probability, Retrieved on: Apr. 13, 2022, 3 Pages.

"Weibull Distribution", Retrieved from: https://en.wikipedia.org/wiki/Weibull_distribution, May 21, 2022, 10 Pages.

Huang, et al., "A Frailty Model for Informative Censoring", In Journal of Biometrics, vol. 58, Issue 3, Sep. 2002, pp. 510-520.

Lee, et al., "DeepHit: A Deep Learning Approach to Survival Analysis with Competing Risks", In Proceedings of the AAAI Conference on Artificial Intelligence, vol. 36, Issue 2, Apr. 26, 2018, 8 Pages.

"Final Office Action Issued in U.S. Appl. No. 15/884,527", Mailed Date: Jun. 8, 2021, 21 Pages.

"Non Final Office Action Issued in U.S. Appl. No. 15/884,527", Mailed Date: Dec. 23, 2020, 15 Pages.

"Notice of Allowance Issued in U.S. Appl. No. 15/884,527", Mailed Date: Nov. 4, 2021, 8 Pages.

Ji, et al., "A Probabilistic Multi-Touch Attribution Model for Online Advertising", In Proceedings of the 25th ACM International on Conference on Information and Knowledge Management, Oct. 24, 2016, 10 Pages.

Lisa, Orr, "Predicting Mobile App User Churn: Training & Scaling Our Machine Learning Model", Retrieved from: https://insidebigdata.com/2017/04/14/predicting-mobile-app-user-churn-training-scaling-machine-learning-model, Apr. 14, 2017, 5 Pages.

* cited by examiner

NOTIFICATION MANAGEMENT AND CHANNEL SELECTION

CROSS-REFERENCE TO RELATED APPLICATIONS

This application is related to U.S. patent application Ser. No. 15/884,527, filed Jan. 31, 2018, and entitled "Predicting Site Visit Based on Intervention," which is incorporated herein by reference in its entirety.

TECHNICAL FIELD

The subject matter disclosed herein generally relates to methods, systems, and machine-readable storage media for predicting if a member will respond to a notification and determining if the notification will be sent.

BACKGROUND

Member engagement and retention is a challenge faced by online services. To increase member engagement, the online services send notifications to the members with information about events happening in the online service, with the hope to encourage the members to engage with the online service, such as by visiting the online service website or accessing the online-service app.

However, sending the wrong notifications may discourage members and lower their satisfaction with the online service. For example, the wrong amount of notifications are sent to one member (e.g., too many notifications), the wrong type of notification is sent to the user (e.g., the member is not interested in the posts of a particular company but we the online service keeps sending notifications from this company), and the notification is sent at the wrong time (e.g., the member prefers to focus on work at the beginning of the work day, but the online service sends many notifications early in the morning). This is why it is important to understand the effect of notifications on members in order to predict the response of members to these notifications, determining if each notification will be sent, and determining the best times to send the notifications.

BRIEF DESCRIPTION OF THE DRAWINGS

Various of the appended drawings merely illustrate example embodiments of the present disclosure and cannot be considered as limiting its scope.

DETAILED DESCRIPTION

Figure 1:
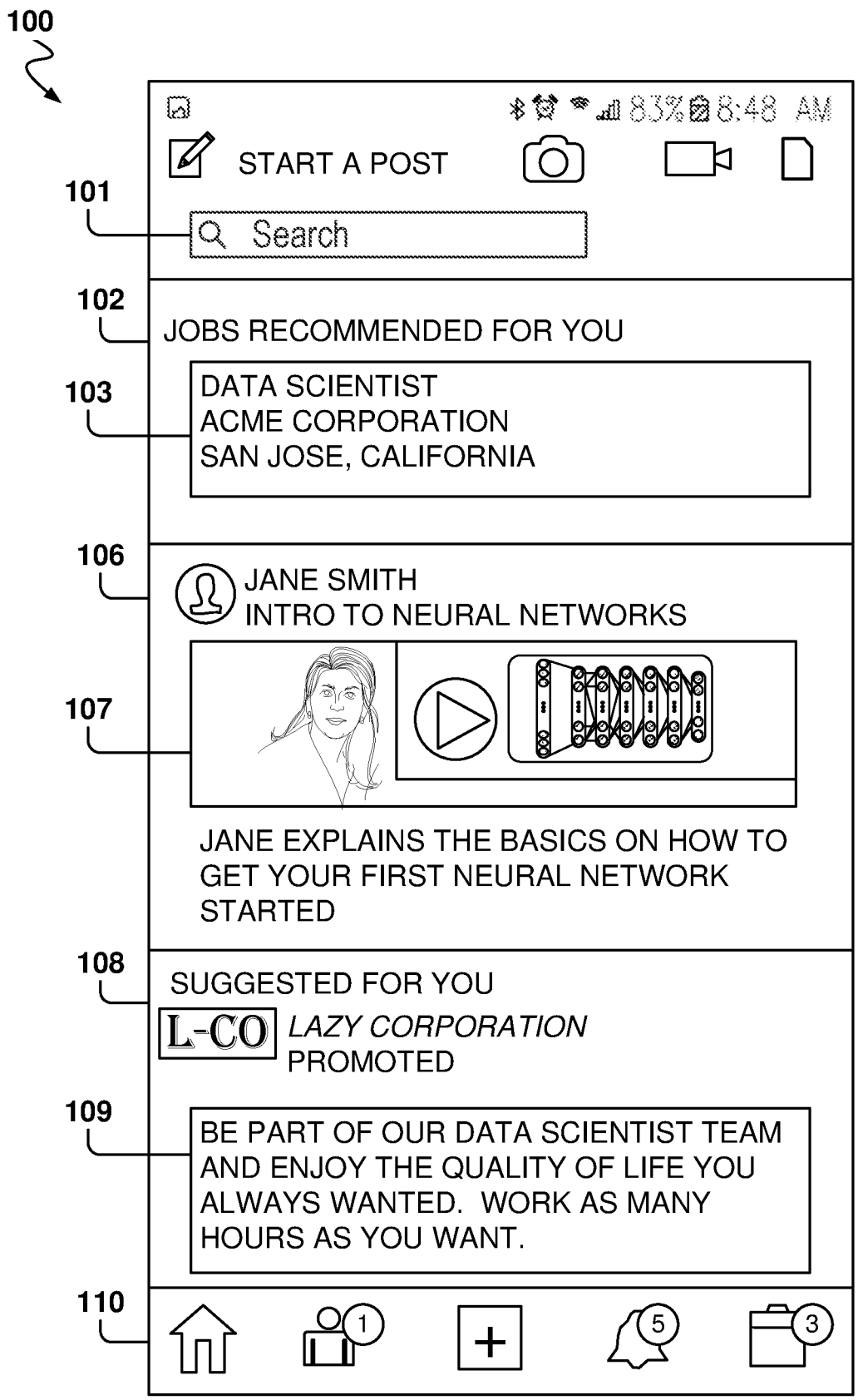
FIG. 1 is a screenshot of a member feed 100, according to some example embodiments.

Example methods, systems, and computer programs are directed to predicting the probability of a member interacting with an online service in response to a notification from the online service or following a member interaction with the service. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

For the purposes of this description the phrases "an online social networking application" and "an online social network system" may be referred to as and used interchangeably with the phrases "an online system," "an online service," "a networked system," or merely "a connections network." It will also be noted that a connections network may be any type of an online network, such as, e.g., a professional network, an interest-based network, or any online networking system that permits users to join as registered members. For the purposes of this description, registered members of a connections network may be referred to as simply members. Further, some connections networks provide services to their members (e.g., search for jobs, search for candidates for jobs, job postings) without being a social network, and the principles presented herein may also be applied to these connection networks.

To improve customer engagement, online services communicate with members through notifications, which are messages sent to the member via different channels, such as in-app messages, mobile-phone notifications, email, etc. It is important to send the right number of notifications, and sending them at the right time, to improve user satisfaction and avoid burnout if too many notifications are sent. Thus, determining the impact of a notification and deciding when to send the notification is an important decision for online services.

In a previous solution, a Weibull AFT Survival Regression ("Weibull") approach was used to implement a model called pVisit for determining whether to send a notification or not. The previous solution used a log-linear approach for the Weibull model. However, there are three problems with the previous approach. First, the log linear regression is a shallow method, and it only calculates the correlation coefficient of the member features, so it is difficult for the model to learn a good abstract representation of member information, and the model is not able to capture latent relations among the member features. Second, the Weibull shape parameter is not personalized based on the member features and context features, so the model cannot distinguish members from different cohorts and is unable to make personalized predictions across members. Third, the previous approach was designed for the badge mobile channel, but not for other channels such as the push-mobile and email channels.

The present embodiments solve these problems by using a deep neural network (DNN) instead of the log linear regression, and the DNN is used to learn a deep representation for each member. It is generally believed that higher representations capture higher-level abstractions relevant to the distribution of interest. Further, lower-level features can be reused in forming higher level representations, and as the depth of the representation increases, the potential gains grow exponentially.

Additionally, the Weibull scale and shape parameters are modeled using two neural networks that take as input the member features and outputs the scale and shape parameters for the Weibull distribution. This guarantees that both the scale and shape parameters are personalized for each member and use case.

Further, the new embodiments provide predictions for different communication channels: badge notifications, push notifications, and emails. The same principles may also be used for other communication channels, such as text messages. For each communication channel, the same network structure may be specified but with different sets of inputs and labels that target the different channels. Moreover, to share knowledge between the two Weibull distribution parameters, or even among different channels, and to save computational resources for training and prediction, the neural networks are designed with a shared structure.

One general aspect includes a method that includes an operation for training respective neural networks to obtain a first model, a second model, and a third model. The first model generates an embedding for a member of an online service based on member information, the second model generates a first parameter for a distribution function, and the third model generates a second parameter for the distribution function. The method further includes an operation for accessing a notification for a member. The first model calculates a member embedding, second model calculates, a first parameter value based on the member embedding, the third model calculates a second parameter value based on the member embedding. The method further includes an operation for determining, based on the first parameter value and the second parameter value for the distribution, a first probability that the member will visit the online service in response to the notification and a second probability that the member will visit the online service without sending the notification. The method further includes an operation for determining to send the notification based on the first probability and the second probability.

FIG. 1 is a screenshot of a member feed 100, according to some example embodiments. In the example embodiment of FIG. 1, the member feed 100 includes different categories, such as search field 101, job recommendations 102, member posts 106, sponsored items 108, and shortcuts 110; other embodiments may include additional categories such as news, messages, articles, etc.

The member posts 106 include item 107 posted by members of the social network service (e.g., items posted by connections of the member), and may be videos, comments made on the social network, pointers to interesting articles or webpages, etc. In the illustrated example, the item 107 includes a video submitted by a member.

In one example embodiment, a social network service user interface provides the job recommendations 102 (e.g., job posts 103 and 109) that match the job interests of the member and that are presented without a specific job search request from the member, referred to herein as "jobs you may be interested in" (JYMBII). In other example embodiments, the member feed 100 includes suggestions or recommendations (not shown) for adding new connections, a feature referred to herein as People You May Know (PYMK).

Although the categories are shown as separated within the member feed 100, the items from the different categories may be intermixed, and not just presented as a block. Thus, the member feed 100 may include a large number of items from each of the categories, and the social network decides the order in which these items are presented to the member based on the desired utilities. Additionally, the member may receive in-network communications from other members. The communications may originate by other members who are socially connected with the member or by unconnected members.

In some example embodiments, the shortcuts 110 include links for accessing the homepage, access members in my network, add a post, notifications, and jobs. The icons in the shortcuts 110 area include notification counters presented within a circle next to the icon. In the illustrated example, there is one message from the member's network, sixth app notifications, and three job suggestions. As used herein, a notification is a message sent to the member. The notification may be sent in multiple ways, such as a message within an application executing on a computing device, a notification sent to a device (e.g., notification presented on a mobile phone), an email sent to the member, a text message, a WhatsApp message, a message on a social network, etc.

An example of a notification is a message regarding people you may know (PYMK) suggesting a new connection on the online service. Another type of notification is a new job that may be interesting for the member.

Members' attention is a valuable commodity for online services. Gaining and retaining member attention forms a basis for growth in terms of both engagement and revenue. Online services have devised many ways to seek a member's attention. Retaining this attention, however, depends on providing value to the members without annoying the member. A good notification service will send a notification that is interesting to the member, and will send the notification at the right time. This way, there is a high likelihood that the member will respond to the notification, e.g., by accessing the online service.

Figure 2:
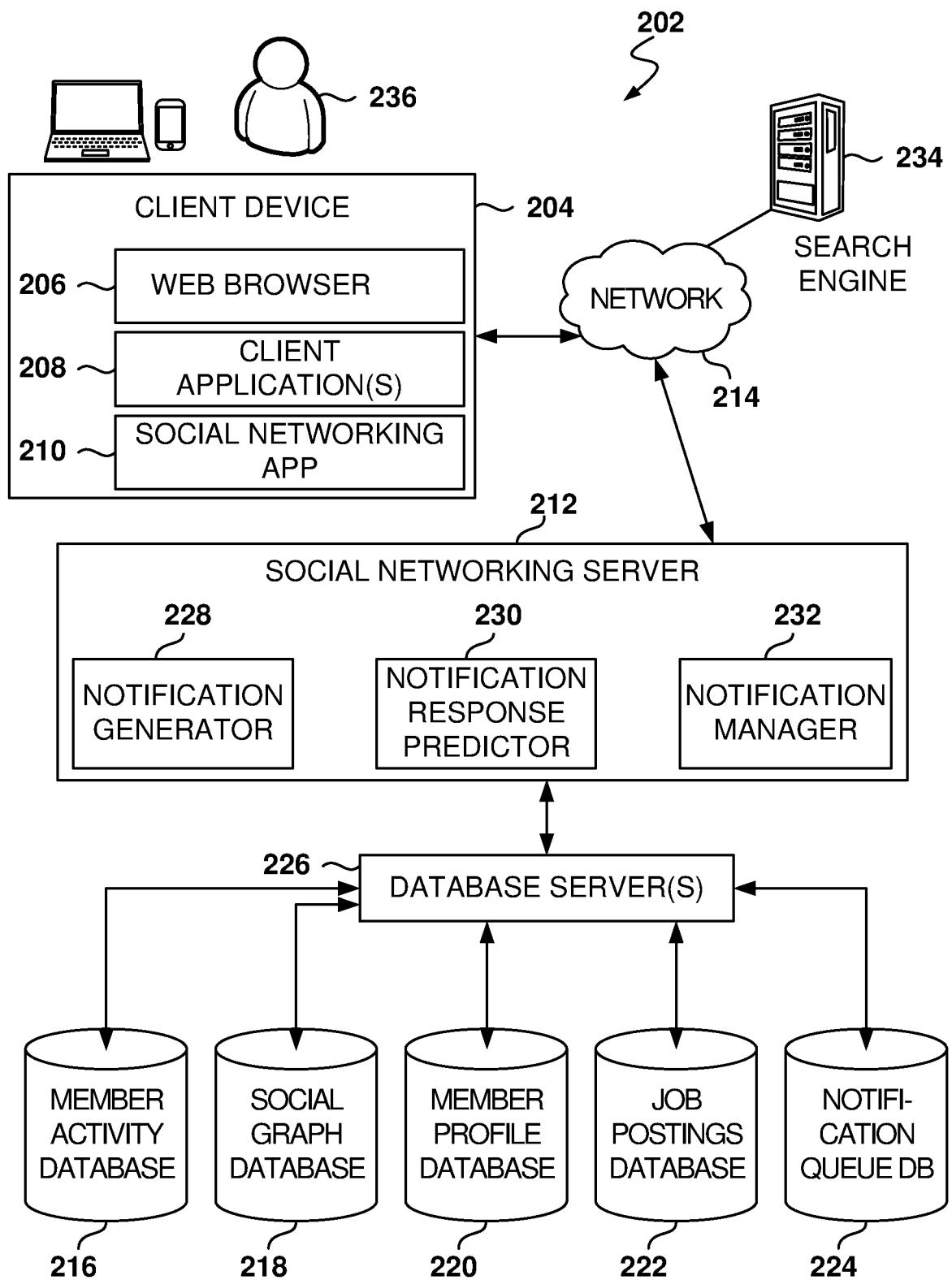
FIG. 2 is a block diagram illustrating a networked system, according to some example embodiments, including a social networking server, illustrating an example embodiment of a high-level client-server-based network architecture.

FIG. 2 is a block diagram illustrating a networked system, according to some example embodiments, including a social networking server 212, illustrating an example embodiment of a high-level client-server-based network architecture 202. Embodiments are presented with reference to an online service, and, in some example embodiments, the online service is a social networking service.

The social networking server 212 provides server-side functionality via a network 214 (e.g., the Internet or a wide area network (WAN)) to one or more client devices 204. FIG. 2 illustrates, for example, a client device 204 with a web browser 206, client application(s) 208, and a social networking app 210 executing on the client device 204. The social networking server 212 is further communicatively coupled with one or more database servers 226 that provide access to one or more databases 216-224.

The social networking server 212 includes, among other modules, a notification generator 228, a notification-response predictor 230, and a notification manager 232. The notification generator 228 creates notifications with messages for members of the online service. The notification-response predictor 230 determines a probability that the member will respond to the notification if the notification is sent, such as by accessing the social networking app 210 or the online service via a web browser 206.

Further, the notification manager 232 coordinates the different activities regarding notifications for members of the online service and sends the notifications to the members.

The client device 204 may comprise, but is not limited to, a mobile phone, a desktop computer, a laptop, a tablet, a netbook, a multi-processor system, a microprocessor-based or programmable consumer electronic system, or any other communication device that a member 236 may utilize to access the social networking server 212. In some embodiments, the client device 204 may comprise a display module (not shown) to display information (e.g., in the form of user interfaces).

In one embodiment, the social networking server 212 is a network-based appliance that responds to initialization requests or search queries from the client device 204. One or more members 236 may be a person, a machine, or other means of interacting with the client device 204. In various embodiments, the member 236 interacts with the network architecture 202 via the client device 204 or another means.

In some embodiments, if the social networking app 210 is present in the client device 204, then the social networking app 210 is configured to locally provide the user interface for the application and to communicate with the social networking server 212, on an as-needed basis, for data and/or processing capabilities not locally available (e.g., to access a member profile, to authenticate a member 236, to identify or locate other connected members 236, etc.). Conversely, if the social networking app 210 is not included in the client device 204, the client device 204 may use the web browser 206 to access the social networking server 212.

In addition to the client device 204, the social networking server 212 communicates with the one or more database servers 226 and databases 216-724. In one example embodiment, the social networking server 212 is communicatively coupled to a member activity database 216, a social graph database 218, a member profile database 220, a job postings database 222, and notification-queue database 224. The databases 216-724 may be implemented as one or more types of databases including, but not limited to, a hierarchical database, a relational database, an object-oriented database, one or more flat files, or combinations thereof.

The member profile database 220 stores member profile information about members 236 who have registered with the social networking server 212. With regard to the member profile database 220, the member 236 may be an individual person or an organization, such as a company, a corporation, a nonprofit organization, an educational institution, or other such organizations.

In some example embodiments, when a member 236 initially registers to become a member 236 of the social networking service provided by the social networking server 212, the member 236 is prompted to provide some personal information, such as name, age (e.g., birth date), gender, interests, contact information, home town, address, spouse's and/or family users' names, educational background (e.g., schools, majors, matriculation and/or graduation dates, etc.), employment history (e.g., companies worked at, periods of employment for the respective jobs, job title), professional industry (also referred to herein simply as "industry"), skills, professional organizations, and so on. This information is stored, for example, in the member profile database 220.

Similarly, when a representative of an organization initially registers the organization with the social networking service provided by the social networking server 212, the representative may be prompted to provide certain information about the organization, such as a company industry.

As members 236 interact with the social networking service provided by the social networking server 212, the social networking server 212 is configured to monitor these interactions. Examples of interactions include, but are not limited to, commenting on posts entered by other members 236, viewing member profiles, editing or viewing a member's own profile, sharing content outside of the social networking service (e.g., an article provided by an entity other than the social networking server 212), updating a current status, posting content for other members 236 to view and comment on, posting job suggestions for the members 236, searching job postings, and other such interactions. In one embodiment, records of these interactions are stored in the member activity database 216, which associates interactions made by a member 236 with his or her member profile stored in the member profile database 220.

The job postings database 222 includes job postings offered by companies. Each job posting includes job-related information such as any combination of employer, job title, job description, requirements for the job posting, salary and benefits, geographic location, one or more job skills desired, day the job posting was posted, relocation benefits, and the like.

The notification-queue database 224 stores notifications generated by the notification generator 228 that are ready for processing, or that have been sent to the members.

While the database server(s) 226 are illustrated as a single block, one of ordinary skill in the art will recognize that the database server(s) 226 may include one or more such servers. Accordingly, and in one embodiment, the database server(s) 226 implemented by the social networking service are further configured to communicate with the social networking server 212.

The network architecture 202 may also include a search engine 234. Although only one search engine 234 is depicted, the network architecture 202 may include multiple search engines 234. Thus, the social networking server 212 may retrieve search results (and, potentially, other data) from multiple search engines 234. The search engine 234 may be a third-party search engine.

Figure 3:
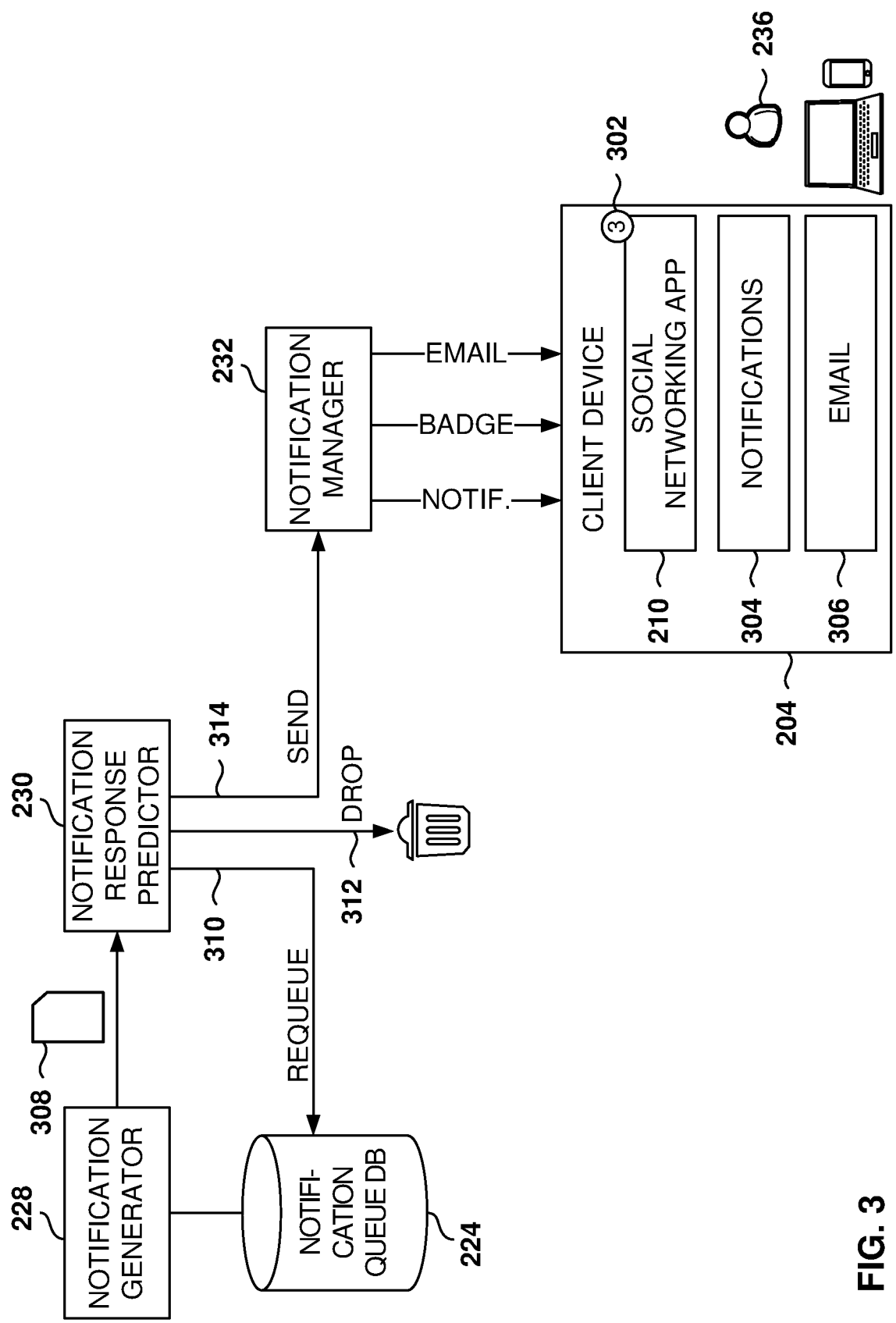
FIG. 3 illustrates the processing of notifications based on expected response, according to some example embodiments.

FIG. 3 illustrates the processing of notifications based on expected response, according to some example embodiments. A notification generator 228 generates notifications 308 for members 236. The notification 308 is accessed by the notification response predictor, either via a message from the notification generator or by accessing the notification-queue database 224.

As used herein, a visit is an interaction of the member with the online service and can include using a web browser to visit the online-service website, accessing the social-networking app on the client device, etc.

In some example embodiments, the notification-response predictor 230 calculates a probability that a member 236 will respond to a notification 308, e.g., by visiting the online service. Further, the notification-response predictor 230 also calculates the probability that the member 236 will visit the online service without receiving the notification 308. Based on the difference between the probabilities, the notification-response predictor 230 decides whether to send 314 the notification 308 to the member, drop 312 the notification, or requeue 310 the notification 308 for processing at a later time.

Some notifications may be queued because they may still be relevant at a later time, such as a notification informing that a connection of the member changed jobs because this notification is relevant for a few days. Other notifications will not make sense if sent later, such as a birthday announcement, because the system does not want to send birthday notifications the day after the birthday. Thus, a notification may include an expiration time and if the decision is made not to send now, the notification may be queued back if there is still time before the expiration time to process the notification. Otherwise, the notification is dropped. In some cases, the notification (e.g., a birthday notification) is queued and revaluated at a later time (e.g., after four hours). Other notifications are not queued, such as a notification that a connection of the member has entered a new post on the online service because this type of notification is best sent out in a timely manner to give the member an opportunity to react fast the new post.

In some example embodiments, the notification-response predictor 230 calculates respective pairs of probabilities (e.g., response with or without sending the notification) for the different channels (e.g., app notification, badge, email, etc.), and based on the probabilities, the notification-response predictor 230 selects one or more channels for sending the notification. The decision for selecting a channel is based on the channel that provides the best probability that the member 236 will respond to the notification 308, and which pair of probabilities present the biggest difference, that is, the best improvement resulting from sending the notification.

In general, the larger the difference of the probabilities, the more interesting the notification is for the member 236 so the notification should be sent. The differences may vary significantly. For example, a member that accesses the online service frequently (85% probability to access on a given week) will show a small difference (e.g., 5%) because the notification will encourage the member to visit, but the member would have likely accessed the online service anyway.

For members that do not visit the online service frequently (e.g., 10% probability on a given week), the notification may cause a big change in probability, such as 50% improvement or more, which will indicate that the notification is valuable for the member. Thus, the thresholds for sending the notification may be customized by member based on the member level of activity on the online service.

A machine-learning (ML) model called the pVisit model is used to calculate the probability that the member will respond to a notification 308 sent on a given channel by visiting the online service. The pVisit model uses as inputs information to determine the relevance of the notification 308 to the member 236. The input information may include member profile information, history of interactions of the member in the online service, content of the notification, time of the day for sending, responses of members to notifications, and others. The pVisit model also calculates the probability that the member will visit the online service without the notification being sent.

For example, the input information can include data indicating that the member has visited the online service after a certain amount of time after receiving or viewing the notification, or performed other actions on the online service, such as disabled notifications on the social networking app or mobile phone, deleted the social networking app, unsubscribe from all or some notification types, etc.

If the notification-response predictor 230 determines to send 314 the notification, the notification is forwarded to the notification manager 232 with instructions of the time to send the notification (e.g., right away, within a time window) and the channel, or channels, selected for the notification. The notification manager 232 sends the notification to the client device 204, such as an app notification 302, a badge notification 304, an email 306, etc.

Figure 4:
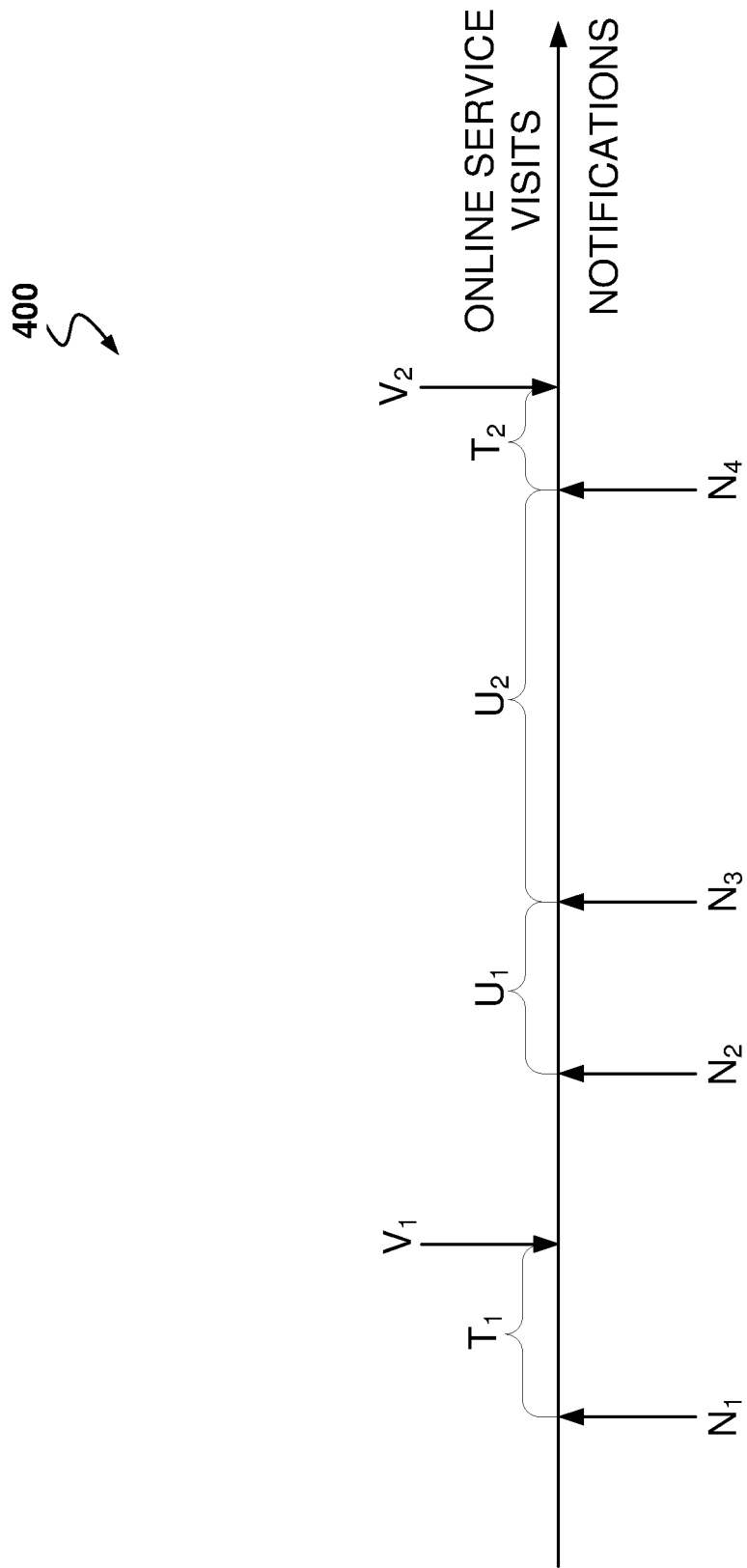
FIG. 4 illustrates a timing diagram of an embodiment of notification events and online service visits, according to some example embodiments.

FIG. 4 illustrates a timing diagram 400 of an embodiment of notification events and online service visits, according to some example embodiments. A challenging problem is determining the time between a notification (N) and a visit (V) to the online service. In the illustrated example of FIG. 4, a first visit $V_1$ is observed at time $T_1$ after notification $N_1$, resulting in a straight calculation of the time $T_1$ between the notification and the visit.

However, not all scenarios are this simple. Considering the visit $V_2$ observed after three notifications $N_2$, $N_3$, and $N_4$, it is not clear which of the notifications $N_2$, $N_3$, and $N_4$, if any, caused the member to visit the online service at $V_2$. The visit $V_2$ is observed in a time $T_2$ after the notification $N_4$. However, there was no visit observed directly after $N_2$ or directly after $N_3$. The notifications $N_2$ and $N_3$ are said to be "right-censored." $N_2$ is right-censored by $N_3$, and $N_3$ is right-censored by N4. Censored notifications can be treated differently than un-censored notifications (e.g., notifications which are immediately followed by a visit before another notification is observed). Un-censored notifications in the example include $N_1$ and $N_4$, which are followed by visit $V_1$ and $V_2$, respectively, without another notification event between the notification and the visit. Censored events in the example include the notifications $N_2$ and $N_3$. These notifications are followed immediately by a further notification without a visit between the notification and the next notification. Times between consecutive notification events are labelled as $U_1$ and $U_2$.

If only the times $T_1$ and $T_2$ are used for training, a biased expectation time-to-visit is realized. The biased expectation time can tend to be less than the actual time to visit. To help alleviate this problem, both the censored times, $U_1$ and $U_2$, and the uncensored times, $T_1$ and $T_2$ can be recorded and used for training. A censor bit can indicate whether the time corresponds to a censored or un-censored time. An example of data that can be used for training is provided in Table 1.

TABLE 1

| OBSERVATION | TIME TO EVENT | CENSORED BIT |
| --- | --- | --- |
| 1 | $T_1$ | 0 |
| 2 | $U_1$ | 1 |
| 3 | $U_2$ | 1 |
| 4 | $T_2$ | 0 |

A survival analysis can be performed to train with censored data. Both censored and uncensored time frames can be used in a model using a likelihood analysis, such as in equation (1) below:

$$L(\theta) \propto \begin{cases} Pr(T = t|\theta) & \text{if un-censored} \\ Pr(T > u|\theta) & \text{if censored} \end{cases} \quad (1)$$

Figure 5:
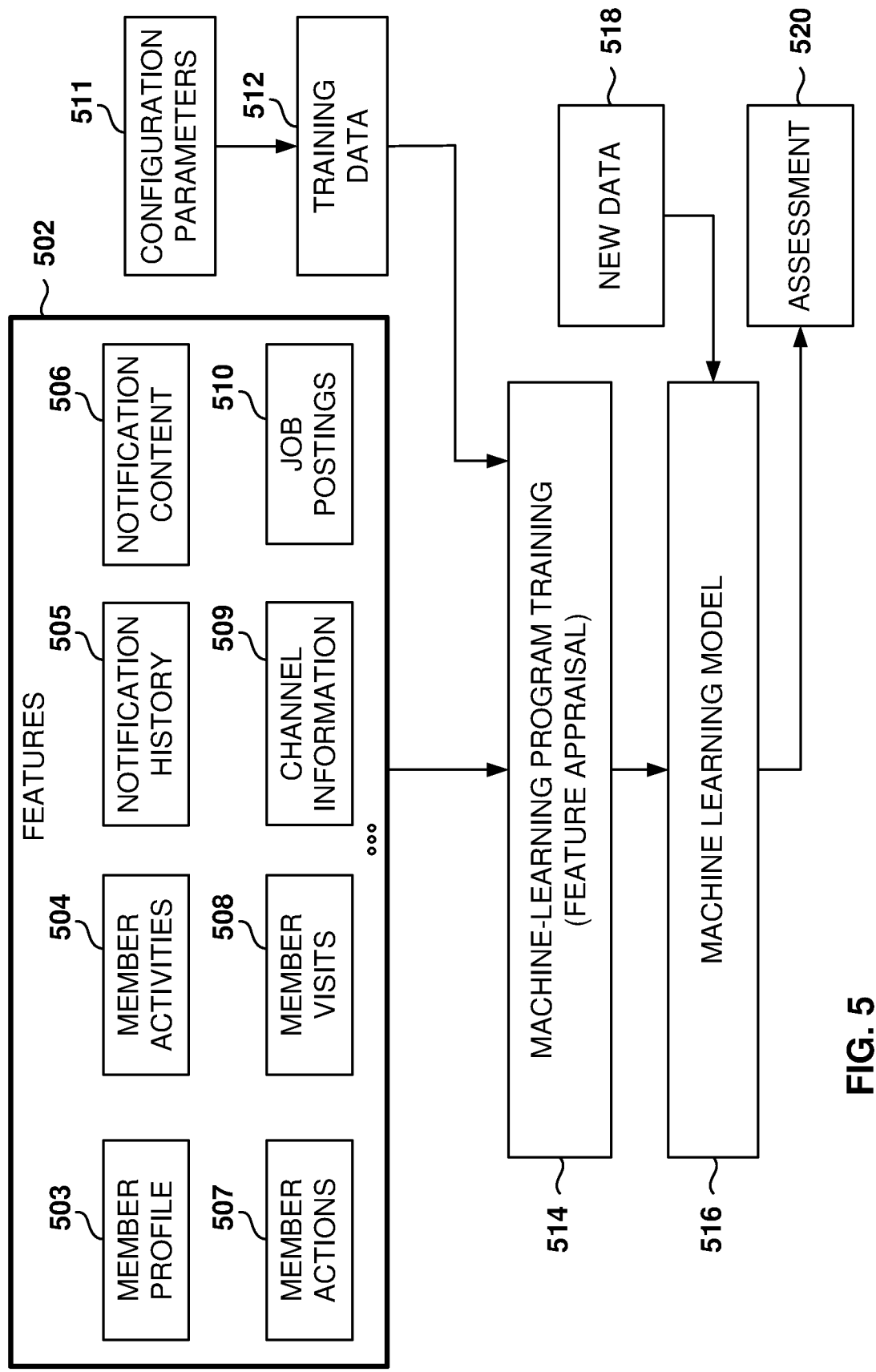
FIG. 5 illustrates the training and use of a machine-learning model, according to some example embodiments.

FIG. 5 illustrates the training and use of a machine-learning model, according to some example embodiments. In some example embodiments, machine-learning (ML) models 516 are utilized to estimate a probability of a visit in response to a notification and a probability of a visit without sending the notification.

Machine Learning (ML) is an application that provides computer systems the ability to perform tasks, without explicitly being programmed, by making inferences based on patterns found in the analysis of data. Machine learning explores the study and construction of algorithms, also referred to herein as tools, that may learn from existing data and make predictions about new data. Such machine-learning algorithms operate by building an ML model 516 from example training data 512 in order to make data-driven predictions or decisions expressed as outputs or assessments 520. Although example embodiments are presented with respect to a few machine-learning tools, the principles presented herein may be applied to other machine-learning tools.

Data representation refers to the method of organizing the data for storage on a computer system, including the structure for the identified features and their values. In ML, it is typical to represent the data in vectors or matrices of two or more dimensions. When dealing with large amounts of data and many features, data representation is important so that the training is able to identify the correlations within the data.

There are two common modes for ML: supervised ML and unsupervised ML. Supervised ML uses prior knowledge (e.g., examples that correlate inputs to outputs or outcomes) to learn the relationships between the inputs and the outputs. The goal of supervised ML is to learn a function that, given some training data, best approximates the relationship between the training inputs and outputs so that the ML model can implement the same relationships when given inputs to generate the corresponding outputs. Unsupervised ML is the training of an ML algorithm using information that is neither classified nor labeled, and allowing the algorithm to act on that information without guidance. Unsupervised ML is useful in exploratory analysis because it can automatically identify structure in data.

Common tasks for supervised ML are classification problems and regression problems. Classification problems, also referred to as categorization problems, aim at classifying items into one of several category values (for example, is this object an apple or an orange?). Regression algorithms aim at quantifying some items (for example, by providing a score to the value of some input). Some examples of commonly used supervised-ML algorithms are Logistic Regression (LR), Naive-Bayes, Random Forest (RF), neural networks (NN), matrix factorization, and Support Vector Machines (SVM).

In some embodiments, the ML model 516 calculates a probability that a member will visit in response to a notification as a function of time. Further, the probability that the member will visit in response to the notification within a predetermined amount of time may be calculated based on the probability calculated as a function of the time after the notification. The response from the member includes a visit to the online service, such as opening the social networking app or accessing the website. The model 516 can also calculate the probability that a member will visit the online service within a predetermined period of time in the absence of the notification sent. Different models 516 may be created for each of the notification channels. In some example embodiments, the ML model calculates the probabilities for a plurality of channels.

The training data 512 comprises examples of values for the features 502. In some example embodiments, the training data comprises labeled data with examples of values for the features 502 and labels indicating the outcome, such as the member responded to the notifications. The machine-learning algorithms utilize the training data 512 to find relationships among identified features 502 that affect the outcome. A feature 502 is an individual measurable property of a phenomenon being observed. The concept of a feature is related to that of an explanatory variable used in statistical techniques such as linear regression. Choosing informative, discriminating, and independent features is important for effective operation of ML in pattern recognition, classification, and regression. Features may be of different types, such as, numeric, strings, categorical, and graph. A categorical feature is a feature that may be assigned a value from a plurality of predetermined possible values (e.g., this animal is a dog, a cat, or a bird).

In one example embodiment, the features 502 may be of different types and may include one or more of member profile information 503 (e.g., email, address, work history, demographics, members followed on the online service, skills, title, etc.), member activities 504 in the online service (e.g., visits to the online service, articles read, jobs searched, job applications, messages within the online service, etc.), notification history 505 that includes the notifications sent to members, notification content 506 of the notifications sent, member visits 507 in response to the notifications received, other member actions 508 within the online service app, information 509 about channels for notifications, job postings 510, etc.

During training 514, the ML program, also referred to as ML algorithm or ML tool, analyzes the training data 512 based on identified features 502 and configuration parameters 511 defined for the training. The result of the training 514 is the ML model 516 that is capable of taking inputs to produce assessments.

Training an ML algorithm involves analyzing large amounts of data (e.g., from several gigabytes to a terabyte or more) in order to find data correlations. The ML algorithms utilize the training data 512 to find correlations among the identified features 502 that affect the outcome or assessment 520. In some example embodiments, the training data 512 includes labeled data, which is known data for one or more identified features 502 and one or more outcomes, such as responses of the members to the notifications received.

Many ML algorithms include configuration parameters 511, and the more complex the ML algorithm, the more parameters there are that are available to the member. The configuration parameters 511 define variables for an ML algorithm in the search for the best ML model. The training parameters include model parameters and hyperparameters. Model parameters are learned from the training data, whereas hyperparameters are not learned from the training data, but instead are provided to the ML algorithm.

When the ML model 516 is used to perform an assessment, new data 518 is provided as an input to the ML model 516, and the ML model 516 generates the assessment 520 as an output. For example, the ML model 516 is the pVisit model and may receive as input a notification and the identifier (ID) of the member recipient, and estimate probabilities that the member will visit the online service within a predetermined period of time if the notification is sent and if the notification is not sent. The probability difference between the conditions of sending and not sending the notification represents how valuable it is to send this notification.

The ML model 516 can implement an accelerated failure time technique, such as can be constrained by a Weibull distribution, in determining the parameters, discussed in more detail below.

In some example embodiments, results obtained by the model 516 during operation (e.g., outputs 520 produced by the model in response to inputs) are used to improve the training data 512, which is then used to generate a newer version of the model. Thus, a feedback loop is formed to use the results obtained by the model to improve the model.

A visit can be included within a session in the training data. Further, m is a general notification event and $m_j$ is a notification event of type j. Let $T_1$ be a time between a notification and a visit for member i, w a time window (e.g., one, two, three, four, or more hours, or one day, two days, or more days), and $z_i$ the features of member i, which may be time dependent. Further, $y_i$ is a binary digit indicating whether a notification will be sent to member i, and is a binary digit indicating whether a notification of type $m_j$ will be sent to member i. Additionally, $F_i(t)=Pr(T_i \leq t|z_i,m)$ is the probability that a member i visits the website before time t after a notification event, $f_i(t)=dF_i(t)/dt$ is the probability density function of visiting, and $S(t)=Pr(T_i>t_i|z_i,m)$ is the probability that a member does not visit from time 0 to time t.

To boost active members over a predefined period (e.g., weekly, daily, monthly) through a single type of notification, two probabilities are considered. A first probability can include $Pr(T_i \leq w|z_i,m)$, the probability of a member i visiting the online service in the next w time window given a notification sent right now. A second probability can include $Pr(T_i \leq w|z_i, \text{not } m)$, the probability of a member i visiting the online service in the next w time window without a notification. The greater the difference between the first probability and the second probability, the greater the motivation to issue a notification. It is noted that w can be chosen based on the case. For example, w can be set 7 if it is desired to boost weekly active members or 1 if it is desired to boost daily active members.

In embodiments in which there is an option between multiple types of notifications, the first probability can include $Pr(T_i \leq w|z_i,mj)$, the probability of a member i visiting the online service in the next w time window given a specific notification of notification type j sent. A second probability can include $Pr(T_i \leq w|z_i, \text{not } m_j)$, the probability of a member i visiting the online service in a next w time window without a notification. A probability of notification influence can be defined as $\Delta Pr(T_i \leq w|z_i, m_j) = Pr(T_i \leq w|z_i, m_j) - Pr(T_i \leq w|z_i, \text{not } m_j)$.

An example use case includes determining an electronic mail transmission volume to help increase member activity or retention. The following equation can be solved to determine an amount of electronic mail to be transmitted to help maximize website visits.

$$\max(\text{expected unique visits in next } t \text{ days}) = \Sigma_i^n[y_i Pr(T \leq t|z_i,m) + (1-y_i)Pr(T \leq t|z_i, \text{not } m)] \text{ such that } \Sigma_i^n y_i \leq C. \quad (2)$$

Equivalently, there exists a cutoff value a for each C such that equation (2) is an optimal solution.

$$\text{if } Pr(T_i \leq t|z_i,m) - Pr(T_i \leq t|z_i, \text{not } m) - \alpha \geq 0, \text{ then } y_i=1. \quad (3)$$

Instead of choosing α for a batch budget C, a threshold β can be chosen, such that when $Pr(T_i \leq t|M) - Pr(T_i \leq t|\text{not } M) \geq \beta$ a notification is provided to the member i.

Different types of notifications can be sent to a member, and the member can respond differently to the different types of notifications. These responses to the different types of notifications can be considered in the training of the pVisit model. The pVisit model is used to compare the responses of the members to the different types of notifications, which can assist in determining the best channel, or channels, to send the notification. The equation below regards a formula for determining a notification probability in an embodiment in which multiple types of notifications are possible.

$$\max \sum_i^n \sum_j [y_{i,j} Pr(T \leq t|z_i, M_j) + (1-y_{i,j})Pr(T \leq t|z_i, \text{not } M_j)]$$

$$\text{such that } \sum_i^n \sum_j y_{i,j} \leq C \ \& \sum_j y_{i,j} \leq 1, \forall i.$$

Equivalently, there exists a cutoff value a for each C such that equation (5) is an optimal solution.

$$\text{if } Pr(T_i \leq t | z_{i,j*}, M_{j*}) - Pr(T_i \leq t|z_{i,j*}, \text{not } M_{j*}) - \alpha \geq 0,$$

$$\text{then } y_{i,j*} = 1, y_{i,j} = 0, \text{ if } j \neq j^*,$$

$$\text{where } j^* = \arg\max_j[Pr(T \leq t|z_i, M_j) - Pr(T \leq t|z_i, \text{not}M_j)].$$

The pVisit model calculates the probability of a visit if a notification is sent P(visit notification) and the probability of a visit without sending a notification P(visit no notification).

Figure 6:
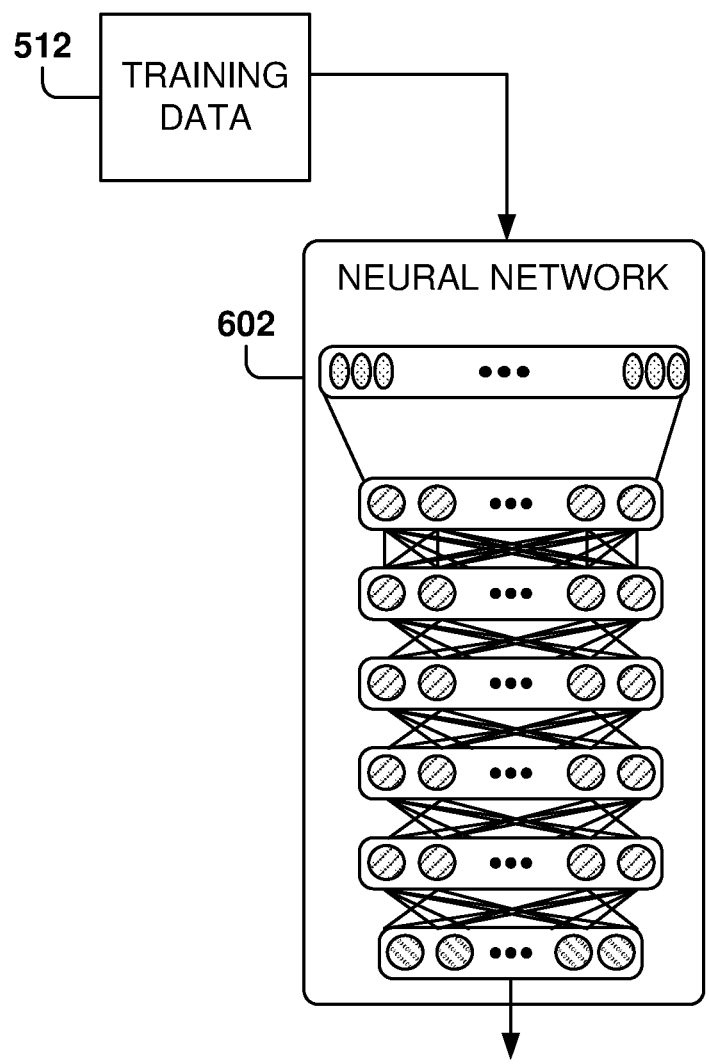
FIG. 6 is a neural network for implementing embodiments.

FIG. 6 is a neural network for implementing embodiments. In some example embodiments, the pVisit model uses neural networks 602 (e.g., deep learning, deep convolutional, or recurrent neural network), which comprises a series of "neurons," such as Long Short Term Memory (LSTM) nodes, arranged into a network, and the neural networks are trained with training data 512. A neuron is an architectural element used in data processing and artificial intelligence, particularly machine learning, that includes memory that may determine when to "remember" and when to "forget" values held in that memory based on the weights of inputs provided to the given neuron. Each of the neurons used herein are configured to accept a predefined number of inputs from other neurons in the network to provide relational and sub-relational outputs for the content of the frames being analyzed. Individual neurons may be chained together and/or organized into tree structures in various configurations of neural networks to provide interactions and relationship learning modeling.

Neural networks utilize features for analyzing the data to generate assessments (e.g., estimate shape and scale parameters of the Weibull model). A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input, which assigns significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

Figure 7:
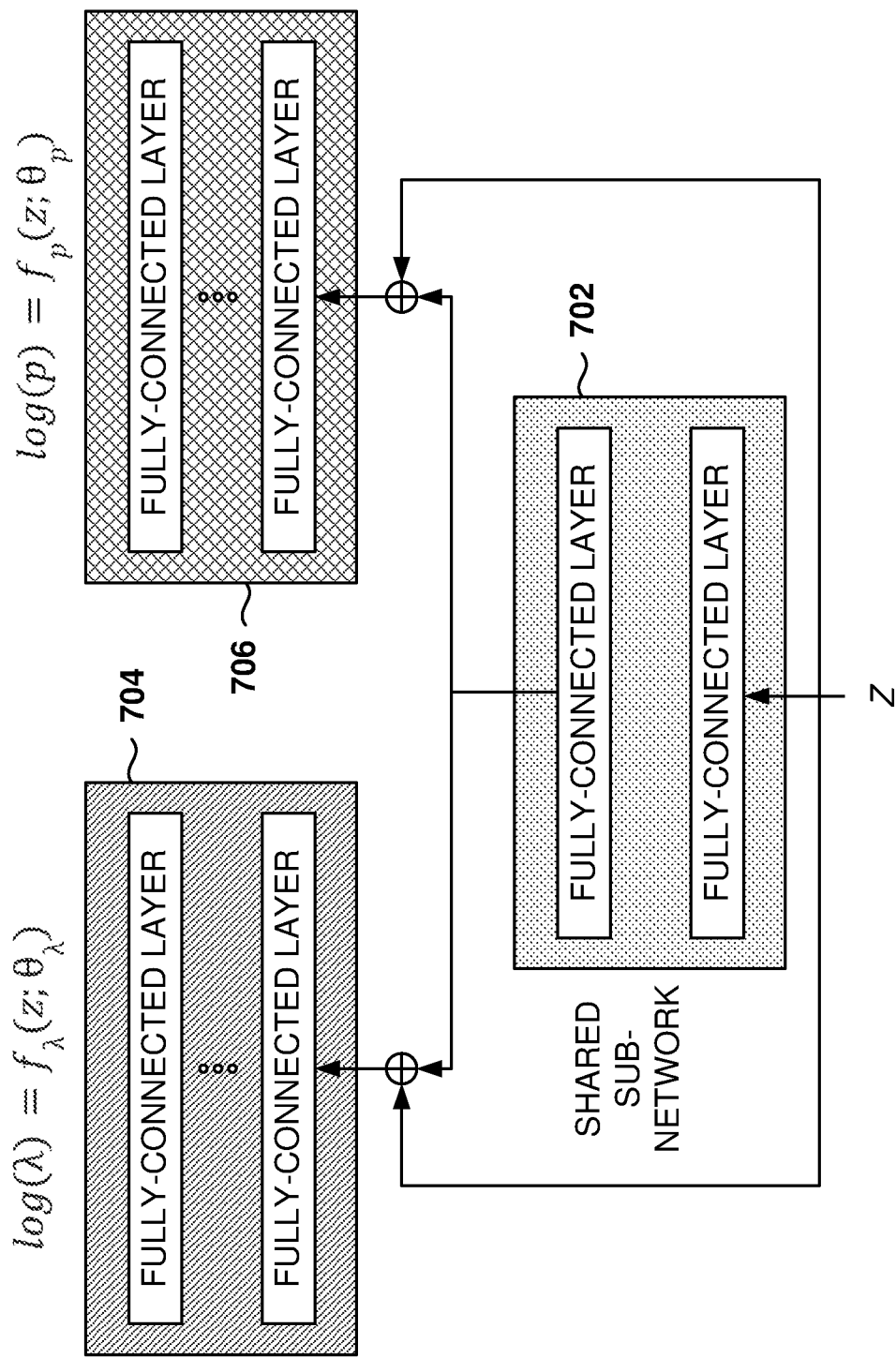
FIG. 7 illustrates the use of neural networks for survival analysis, according to some example embodiments.

FIG. 7 illustrates the use of neural networks for survival analysis, according to some example embodiments. In some example embodiments, the decision to send or drop a notification is modeled as a survival analysis problem. These models analyze the expected duration of time until one event occurs (e.g., a member visits the app or clicks one of the push cards) or the event is censored (a new notification is sent to the member. In some embodiments, the modeling is performed using the Weibull distribution, assuming time T to event (e.g., visit) has a Weibull($\mu$, p) with a density function $f(t)=p\mu t^{p-1} \exp(-\mu t^p)$. The variables to describe the Weibull distribution include survival time t, scale $\lambda$, shape p, u represented as $\lambda=1/\mu^{(1/p)}$, input features z, $\alpha$ as the parameter for $f\lambda$ in the AFT model, and $\beta$ as the parameter for $f\lambda$ in the PH model.

The Weibull distribution provides flexibility in modelling and analysis of time-to-event data. The probability density function of a Weibull distribution is:

$$f(t; \lambda; p) = \begin{cases} p\lambda t^{p-1} e^{-\lambda x^p} & t \geq 0 \\ 0 & t < 0 \end{cases},$$

An exponential distribution is a special case of the Weibull distribution where p=1. A survival function of the Weibull distribution is provided by the following equation:

$$S(t;\lambda;p)=Pr(T>t)=e^{-\lambda t^p} t \geq 0$$

A hazard function for the Weibull distribution is as follows:

$$h(t; \lambda; p) = \frac{f(t; \lambda; p)}{S(t; \lambda; p)} = p\lambda x^{p-1}$$

The probability cumulative function S(t) is calculated as follows:

$$S(t) = P(T > t) = \int_t^\infty f(u)du = exp(-\lambda t^p)$$

In this equation, p is the shape and $\lambda=1/\mu^{1/p}$ is the scale of the Weibull distribution. The hazard function is defined by $h(t)=f(t)/S(t)=p\mu t^{p-1}$. Further, if p>1, the hazard increases, and if p=1 then the hazard is constant (exponential model). Further, if p<1 the hazard decreases.

There are multiple Weibull models that can be used, including the Weibull Accelerated Failure Time (AFT) model, the Weibull Proportional Hazards (PH) model, an Alternative Weibull model, a deep Weibull AFT model, a Deep Weibull Alternative PH model, a Weibull PH model with frailty, and an Informative Survival model, which are described below. Each architecture provides a different way to convert the features to the parameter of the Weibull distribution. The model 702 is the deep Weibull model, and each alternative provides a way to define functions $f\lambda$ and $fp$, with $\lambda$ and p representing the scale and shape of the Weibull distribution. The parameter z is the input information, such as member information, badge count update, time since last visit, notification type, timestamp, and notification.

To calculate $\lambda$ and p, the models associate $\lambda$ and p to the members based on member information, such as profile and behavior on the online service, badges sent, push notifications sent, etc., that is, the features of the model.

Weibull Accelerated Failure Time (AFT) Model

The Weibull AFT model describes stretching out or contraction of survival time as a function of predictor variables. The Weibull AFT model uses the model features z=(1, $z_i, \ldots, z_k$) and parameters $\alpha=(\alpha_0, \alpha 1, \ldots, \alpha_k)$. The model can be expressed on the log scale as follows:

$$\log(T)=\alpha_0+\alpha_1 z_1+ \ldots +\alpha_k z_k+\sigma\epsilon = \alpha z+\sigma\epsilon$$

This is one way to make the connections between the parameter of Weibull distribution and the features. In this equation, $\epsilon$ is a random error following some defined distributions. If E follows an extreme value distribution, T follows a Weibull distribution. In some embodiments, the model is parameterized using $\sigma=1/p$, $1/(x^{1/p})=\exp(\alpha\ z)$.

The following assumptions are used for the Weibull AFT model:

(1) non-informative censoring, when each subject has a censoring time that is statistically independent of their failure times;
(2) survival times (t) are independent;
(3) there is a log-linear relation between T and z;
(4) p is constant or unaffected by z; and
(5) features z are independent.

Further, p is a global value for the AFT model, and p is trained based on all the member information, that is, p is personalized for each member. In the previous log-linear approach only $\lambda$ was that personalized based on each member, but in the new approach p is also personalized to the member.

Weibull Proportional Hazards (PH) Model

The Weibull PH model uses the following equation for the Weibull parameters:

$$\lambda=\exp(\beta_0+\beta_1 z_1+ \ldots +\beta_k z_k)=\exp(\beta z), \text{ where } \beta=(\beta_0, \beta_1, \ldots, \beta_k)$$

In the Weibull AFT, the scale is expressed as $1/\lambda^{1/p}=\exp(\alpha\ z) => \log(\lambda)=-p(\alpha\ z)$, while in the Weibull PH model, the scale is expressed as $\lambda=\exp(\beta\ z) => \log(\lambda)=\beta z$.

This shows the relationship between the coefficients $\beta=-p\alpha$. The AFT assumption holds if, and only if, the PH assumption holds (given that p is fixed). Further, the assumptions of the Weibull AFT model also hold in the Weibull PH model. For the Weibull HP model, the hazards are proportional with the hazard ratio (HR) being constant overtime.

Alternative Weibull Model

For the Weibull PH and AFT model, there is an assumption that the shape p is not affected by z. In the Alternative Weibull model, this assumption is eliminated by parameterizing $p=\exp(\delta\ z)$, with parameters $\delta=(\delta_0, \delta_1, \ldots, \delta_k)$.

Deep Weibull Model

In the Deep Weibull model, the features $(z_1, \ldots, z_k)$ are not assumed to be independent, that is, the assumption that the relation between T (or $\lambda$) and z is log-linear is not a realistic assumption. Under the log-linear assumption, it is not possible to incorporate new but dependent features. Instead, the Deep Weibull model parameterizes $\log(\lambda)=f_\lambda(z; \theta_\lambda)$ as a neural network 704 and $\log(p)=f_p(Z; \theta_p)$ as another neural network 706.

Using the DeepHit approach with parameter sharing, the two neural networks 704 and 706 share a hidden representation; therefore, the two neural networks 704 and 706 are dependent and comparable. Further, the shared architecture reduces the number of parameters, resulting in faster ML training and inference. The model 702 is a model for the Weibull distribution with the output that are inputs for the two neural networks 704 and 706.

A problem in survival analysis is to understand the relationship between the covariates and the (distribution of) survival times (times-to-event). In the DeepHit approach, a deep neural network is used to learn the distribution of survival times directly. DeepHit makes no assumptions about the underlying stochastic process and allows for the possibility that the relationship between covariates and risk(s) changes over time.

DeepHit is a multi-task network which consists of a shared sub-network and K cause-specific sub-networks. A single softmax layer is used as the output layer to ensure that the network learns the joint distribution of K competing events not the marginal distributions of each event. Further, maintain a residual is maintained from the input covariates into the input of each cause-specific sub-network.

The input z is a combination of the member features (e.g., a concatenation of the member feature values), and the output of the model 702 is an embedding of the member features, that is a representation of the member. This output is than used as an input to neural networks 704 and 706 to estimate the values of λ and p for the Weibull distribution. Other inputs for the neural networks 704 and 706 include information about the notification, such as content and send time. The result is the probability p of a visit if the notification is sent.

When training the model, the neural network 704 uses a loss function to be optimized of $\log(\lambda)=f_\lambda(z; \theta_\lambda)$. Thus, the output of the neural network 704 is $\log(\lambda)$. The neural network 704 uses a loss function of $\log(p)=f_p(z; \theta_p)$, and the output is $\log(p)$. For example, during training, gradient descent is used to generate the models for the neural networks 704 and 706.

In some example embodiments, the neural networks 704 and 706 share the same structure, same features, and same training data, so the training process can be simplified. By using the neural networks with deep representations of λ and p, better representations of the members are obtained when compared to the simple regression model, and these deeper representations provide more detailed relationships among the features for better inferences. Further, the neural networks are able to capture non-linear information, where the regression model is not as accurate when non-linear relationships are involved.

Weibull PH Model with Frailty

In the Weibull PH model with frailty, the frailty function is added to the Weibull PH model. Frailty is a random component, accounting for variability due to unobserved individual-level factors.

The frailty α (α>0) has the following properties:
(1) frailty is an unobserved multiplicative effect on the hazard;
(2) frailty follows some distribution g(α) with the mean of g(α)=1;
(3) a parameter θ=var(g(α)) is estimated from the data.

With frailty, the Weibull PH model can be describes as follows:

$$S_U(t) = \int_0^\infty S(t|\alpha)g(\alpha)\,d\alpha$$

Here, $S_U(t)$ and $S(t|\alpha)$ are the unconditional and conditional survival functions, and $S_U(t)$ represents a population average. Further, the hazard function can be extended to $h_j(t|\alpha_j)=\alpha_j h(t)$, where $\alpha_j$ denotes the frailty for the j-th subject and α~gamma (μ=1, var=θ).

Informative Survival Model

Most of the methods for analyzing censored survival data assume that the censoring is non-informative or ignorable. This is most clearly seen in the way censored observations enter the likelihood function. If an observation is censored at time c, the contribution to the likelihood is just the probability that lifetime T exceeds c. The fact that the censoring has occurred when it happened has not altered the distribution of T, hence the censoring mechanism is irrelevant for inference about the distribution of T.

However, in many applications the assumption of ignorable censoring is not held. For example, in the notification system, a member may enter the app, click the tab below and the badge count reset to 0, and this action may show the member preference in certain notifications as well. In this case, the censoring is informative. A way to model informative censoring is to embed censored survival data in a competing risks framework. For each individual, there is an assumption that there is a potential random censoring time C and a potential random lifetime T. The censoring is non-informative if C and T are independent and the parameters that govern their distribution are distinct. The time Y=min(T, C) is observed, and the censoring indicator I is defined as: I=1 if T<=C and I=0 if T>C.

The association between the failure time and the censoring processes is introduced by modeling the conditional distribution of C given the value of T. The parameter of the marginal distribution of C is allowed to depend on T through a bias function B(t, θ) and a dependence parameter δ. It is assumed that the conditional distribution of C given T has the same parametric form as its marginal distribution $fc(c, \gamma)$, with the parameter allowed to depend on T, which results in the conditional density P as follows:

$$P(C=c|T=t)=fc(c,\gamma+\delta i_\gamma^{-1/2}B(t,\theta))$$

If δ=0, T and C are independent, and the censoring is ignorable. The parameter δ can be thought of as measuring the size of the dependence between T and C and the bias function B(t, θ) is a scalar function.

Further, to calculate the likelihood function for a parametric model, the following conditions are set:
(1) the likelihood function is a function of the observed data and the unknown parameters of the model;
(2) the likelihood function is based on the distribution of the survival time; and
(3) the likelihood function depends on the censoring of the data.

| Event time | Likelihood contribution |
|---|---|
| T = t | f(t) |
| T > t (right-censored) | $\int_t^\infty f(t)dt$ |
| $t_1 < T < t_2$ (interval-censored) | $\int_{t_1}^{t_2} f(t)dt$ |

The likelihood function is the product of each contribution, as follows:

$$L = f(t) \cdot \int_t^\infty f(t)\,dt \cdot \int_{t_1}^{t_2} f(t)\,dt$$

Further, the following assumptions are used for formulating L:
(1) Subjects are independent (product of contributions);
(2) No competing risks—no competing event prohibits a subject from eventually getting the event of interest; and
(3) Follow-up times are continuous without gaps.

The likelihood for M subjects is $L=\Pi_{i=1}^M L_i$. Further, the maximum likelihood estimates of the parameters are obtained by solving $\partial \log(L)/\partial\theta_j=0$. For the application of making decisions on sending or dropping notifications, there may be cases of right censoring. In this case, a chain rule to derive is used the likelihood of the weibull survival model as follows:

$$L(\lambda, p) = f(t)^{1-\delta} \cdot \left[\int_t^\infty f(t)\,dt\right]^\delta = f(t)^{1-\delta} \cdot F(t)^\delta$$

Further, applying the logarithm to this function results in the following:

$$l(\lambda,p)=(1-\delta)\log f(t)+\delta \log F(t)$$

Thus, the parameters are trained with the maximum likelihood estimate and the log likelihood is chosen as the loss.

To model the effect of notifications on member engagement, pVisit assumes a state transition model. The probability of a member visiting within the next time window T depends on the device context state, how long the device has stayed in the current state, as well as the member's characteristics. A notification item affects a member's engagement behavior by modifying the device context state and resetting the clock that tracks how long the member has stayed in the state, e.g., creating a state transition.

The current pVisit model uses the app badge count as the device context state, and the pVisit model's performance is improved by using a richer device context state definition and the related implementation considerations.

As more communications are sent through any channel, it becomes more and more important to explicitly capture the effects of push cards on member visit probability in the model. The inclusion of push related states into the model enables making a prediction of p(visit|push) using the same model. In addition to the badge count, other items are included in the device context state: number of unread push cards, number of unread push cards by communication type (messages, notifications, connection invites etc.) and notification type, and notification type of the most recent unread push card.

In the survival analyses framework, the probability of a member visit given no notification sent p(visit|no notification) is computed as a conditional probability using the member visit probability function under the current state. This requires knowing when the member's device entered the current device context state at the evaluation time.

For badge count, a feature called lastBadgeCountChangedTime provides the timestamp for the last state change. Additionally, state elements related to unread push cards are changed by either sending a new push card or a member interaction with push cards.

Figure 8:
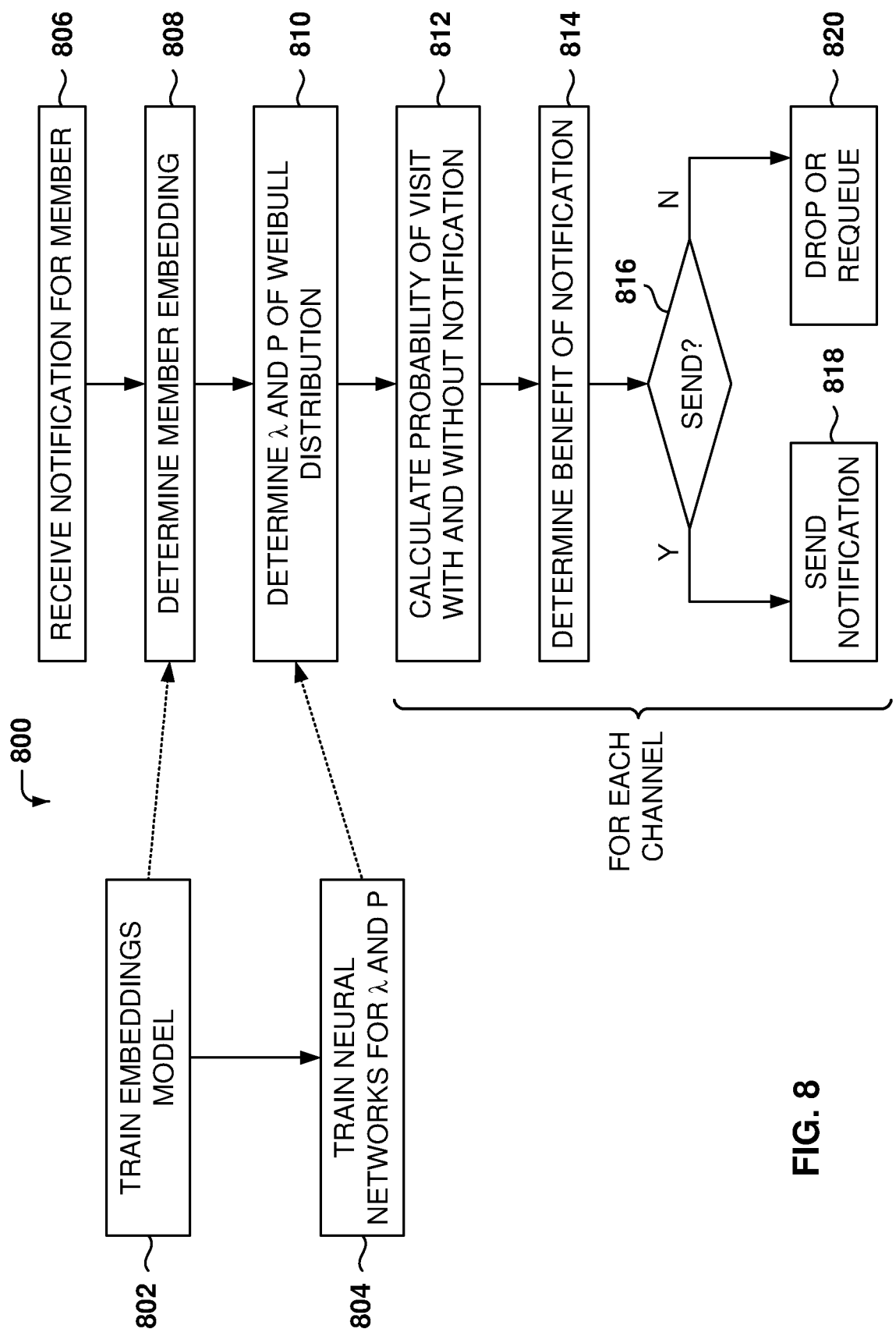
FIG. 8 is a flowchart of a method for determining the processing of a notification using the deep Weibull model, according to some example embodiments.

FIG. 8 is a flowchart of a method 800 for determining the processing of a notification using the deep Weibull model, according to some example embodiments. While the various operations in this flowchart are presented and described sequentially, one of ordinary skill will appreciate that some or all of the operations may be executed in a different order, be combined or omitted, or be executed in parallel.

At operation 802, the embeddings model (e.g., model 702 of FIG. 7) is trained with training data comprising member information, notification information, visits, etc. There embeddings model uses member information to generate an embedding for the member that holds the information about the member.

At operation 804, the neural networks for estimating λ and p are trained. These neural networks estimate the λ and p parameters using the member embedding and notification information.

At operation 806, a notification for a member is received or otherwise detected (e.g., a pointer to the location of the notification in memory).

From operation 806, the method 800 flows to operation 808 where the member embedding is calculated using the embedding model. Additionally, at operation 810, the λ and p are calculated using the models for λ and p.

Operations 812, 814, 818, and 820 are then evaluated for each of the notification channels. At operation 812, the probability p(visit|notification) of a visit within a predetermined time period if the notification is sent is calculated. Also, the probability p(visit|no notification) of a visit within a predetermined time period if the notification is not sent is calculated.

Using the Weibull parameters λ and α, the probability $Pr(T_i \leq w|z_i,m)$ of a member visiting within the next time window w given a notification is calculated as follows:

$$Pr(T_i \leq w|z_i,m)=1-e^{-\lambda_i w^{\hat{\alpha}}}$$

The probability $P(T_i < w|z_i, \neg m)$ of the member i visiting in the next time window w without a notification is also calculated. If no notification is sent, the member is still in the previous state (e.g., the previous badge count). The probability $P(T_i < w|z_i, \neg m)$ can be calculated based on the previous state. The time to visit for the previous state $T_{i,-1}$ follows the Weibull distribution with $\hat{\lambda}_{i,-1}$ and $\hat{\alpha}$. It is known that $T_{i,-1} > t_{-1}$, which means the member did not visit in the past $t_{-1}$.

The member i visiting the site within the next time window w without a notification means $T_{i,-1} \leq w+t_{-1}$ given that $T_{i,-1} > t_{-1}$. Therefore, the probability $P(T_i \leq w|z_i, \neg m)$ can be calculated using the following equation:

$$P(T_i \leq w \mid z_i, \neg m) = P(T_{i,-1} \leq w + t_{-1} | z_i, m_{-1}, T_{i,-1}$$
$$> t_{-1}) = \frac{P(t_{-1} < T_{i,-1} \leq w + t_{-1} | z_i, m_{-1})}{P(T_{i,-1} \geq t_{-1}|z_i, m_{-1})}$$
$$= 1 - \exp\left(-\hat{\lambda}_{i,-1}(w+t_{-1})^{\hat{\alpha}} + \hat{\lambda}_{i,-1}(t_{-1})^{\hat{\alpha}}\right)$$

Based on the calculated probabilities, at operation 814, the benefit of sending the notification is calculated by comparing p(visit|notification) and p(visit|no notification). In some example embodiments, the difference is calculated and if the difference is greater than a predetermined threshold, then the notification will be sent.

At operation 816, a decision is made on whether to send the notification or not based on the calculated probabilities p(visit|notification) and p(visit|no notification).

If the decision is to send the notification, at operation 818, the notification is sent on the respected channel. If the decision is not to send the notification, at operation 820, the notification is dropped or requeued for processing at a later time depending on how time sensitive the notification is.

In some example embodiments, if there is a benefit for more than one channel to send the notification, a selection is made to determine the best channel (e.g., the best benefit) for sending the notification. In another example embodiments, the notification is sent on multiple channels.

Figure 9:
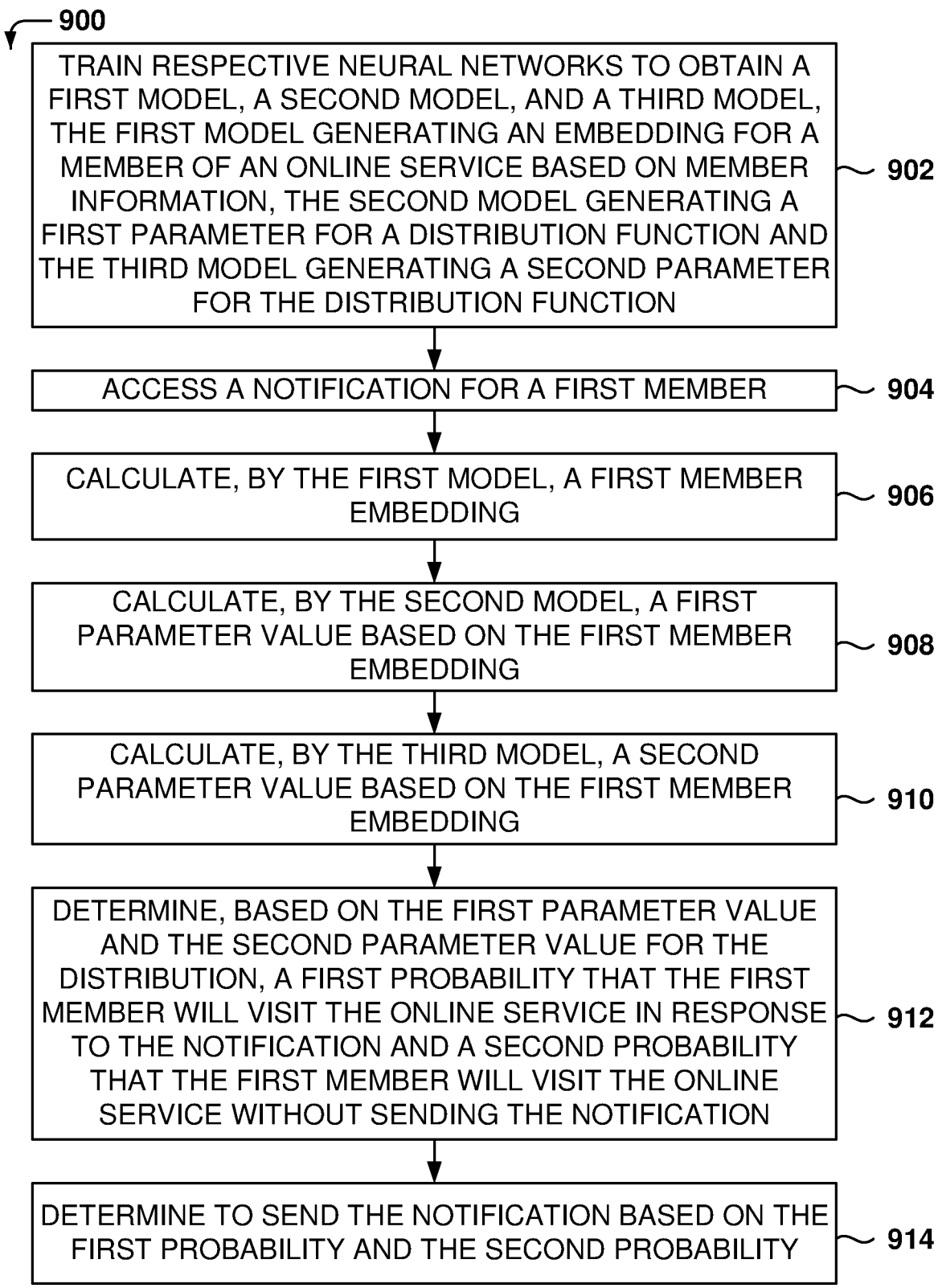
FIG. 9 is a flowchart of a method for predicting the probability of a member interacting with an online service in response to a notification from the online service, according to some example embodiments.

FIG. 9 is a flowchart of a method 900 for predicting a response probability to a sent notification, according to some example embodiments. While the various operations in this flowchart are presented and described sequentially, one of ordinary skill will appreciate that some or all of the operations may be executed in a different order, be combined or omitted, or be executed in parallel.

Operation 902 is for training respective neural networks to obtain a first model, a second model, and a third model. The first model generates an embedding for a member of an online service based on member information, the second model generates a first parameter for a distribution function, and the third model generates a second parameter for the distribution function.

From operation 902, the method 900 flows to operation 904 for accessing a notification for a first member.

Further, from operation 904, the method 900 flows to operation 906 to calculate, by the first model, a first member embedding.

From operation 906, the method 900 flows to operation 908 for calculating, by the second model, a first parameter value based on the first member embedding.

From operation 908, the method 900 flows to operation 910 for calculating, by the third model, a second parameter value based on the first member embedding.

From operation 910, the method 900 flows to operation 912 to determine, based on the first parameter value and the second parameter value for the distribution, a first probability that the first member will visit the online service in response to the notification and a second probability that the first member will visit the online service without sending the notification.

From operation 912, the method 900 flows to operation 914 for determining to send the notification based on the first probability and the second probability.

In one example, the training is based on training data with values for features comprising member profile information, member activity, notifications and visits to the online service.

In one example, the distribution function is a Weibull distribution.

In one example, the first parameter is a shape of the Weibull distribution and the second parameter is a scale of the Weibull distribution.

In one example, a loss function of the second model is based on a log of the shape of the Weibull distribution, and a loss function of the third model is based on a log of the scale of the Weibull distribution.

In one example, determining to send the notification further comprises calculating a difference between the first probability and the second probability, and sending the notification when the difference is greater than a predetermined threshold value.

In one example, the method 900 further comprises requeuing the notification for later processing when the determination is not to send the notification.

In one example, the first and second probability are calculated for a plurality of channels comprising in-app notification, mobile device notification, and email notification.

In one example, the embedding generated by the first model is an input for the second model and the third model.

In view of the disclosure above, various examples are set forth below. It should be noted that one or more features of an example, taken in isolation or combination, should be considered within the disclosure of this application.

Another general aspect is for a system that includes a memory comprising instructions and one or more computer processors. The instructions, when executed by the one or more computer processors, cause the one or more computer processors to perform operations comprising: training respective neural networks to obtain a first model, a second model, and a third model, the first model generating an embedding for a member of an online service based on member information, the second model generating a first parameter for a distribution function and the third model generating a second parameter for the distribution function; accessing a notification for a first member; calculating, by the first model, a first member embedding; calculating, by the second model, a first parameter value based on the first member embedding; calculating, by the third model, a second parameter value based on the first member embedding; determining, based on the first parameter value and the second parameter value for the distribution, a first probability that the first member will visit the online service in response to the notification and a second probability that the first member will visit the online service without sending the notification; and determining to send the notification based on the first probability and the second probability.

In yet another general aspect, a machine-readable storage medium (e.g., a non-transitory storage medium) includes instructions that, when executed by a machine, cause the machine to perform operations comprising: training respective neural networks to obtain a first model, a second model, and a third model, the first model generating an embedding for a member of an online service based on member information, the second model generating a first parameter for a distribution function and the third model generating a second parameter for the distribution function; accessing a notification for a first member; calculating, by the first model, a first member embedding; calculating, by the second model, a first parameter value based on the first member embedding; calculating, by the third model, a second parameter value based on the first member embedding; determining, based on the first parameter value and the second parameter value for the distribution, a first probability that the first member will visit the online service in response to the notification and a second probability that the first member will visit the online service without sending the notification; and determining to send the notification based on the first probability and the second probability.

Figure 10:
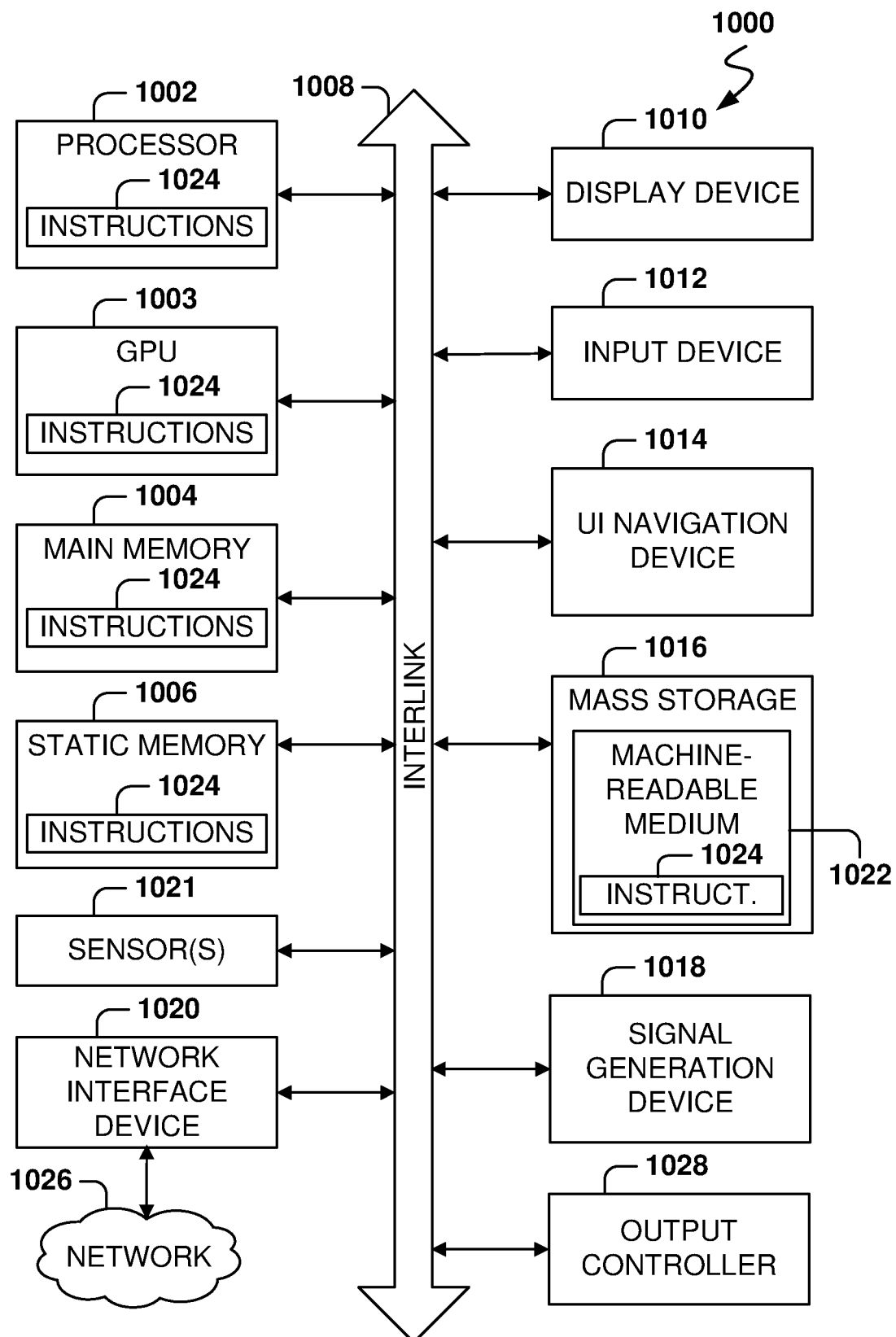
FIG. 10 is a block diagram illustrating an example of a machine upon or by which one or more example process embodiments described herein may be implemented or controlled.

FIG. 10 is a block diagram illustrating an example of a machine 1000 upon or by which one or more example process embodiments described herein may be implemented or controlled. In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in a peer-to-peer (P2P) (or other distributed) network environment. Further, while only a single machine 1000 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1000 may include a hardware processor 1002 (e.g., a central processing unit (CPU), a hardware processor core, or any combination thereof), a graphics processing unit (GPU) 1003, a main memory 1004, and a static memory 1006, some or all of which may communicate with each other via an interlink (e.g., bus) 1008. The machine 1000 may further include a display device 1010, an alphanumeric input device 1012 (e.g., a keyboard), and a user interface (UI) navigation device 1014 (e.g., a mouse). In an example, the display device 1010, alphanumeric input device 1012, and UI navigation device 1014 may be a touch screen display. The machine 1000 may additionally include a mass storage device (e.g., drive unit) 1016, a signal generation device 1018 (e.g., a speaker), a network interface device 1020, and one or more sensors 1021, such as a Global Positioning System (GPS) sensor, compass, accelerometer, or another sensor. The machine 1000 may include an output controller 1028, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 1016 may include a machine-readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within the static memory 1006, within the hardware processor 1002, or within the GPU 1003 during execution thereof by the machine 1000. In an example, one or any combination of the hardware processor 1002, the GPU 1003, the main memory 1004, the static memory 1006, or the mass storage device 1016 may constitute machine-readable media.

While the machine-readable medium 1022 is illustrated as a single medium, the term "machine-readable medium" may include a single medium, or multiple media, (e.g., a centralized or distributed database, and/or associated caches and servers) configured to store the one or more instructions 1024.

The term "machine-readable medium" may include any medium that is capable of storing, encoding, or carrying instructions 1024 for execution by the machine 1000 and that cause the machine 1000 to perform any one or more of the techniques of the present disclosure, or that is capable of storing, encoding, or carrying data structures used by or associated with such instructions 1024. Non-limiting machine-readable medium examples may include solid-state memories, and optical and magnetic media. In an example, a massed machine-readable medium comprises a machine-readable medium 1022 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1024 may further be transmitted or received over a communications network 1026 using a transmission medium via the network interface device 1020.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Additionally, as used in this disclosure, phrases of the form "at least one of an A, a B, or a C," "at least one of A, B, and C," and the like, should be interpreted to select at least one from the group that comprises "A, B, and C." Unless explicitly stated otherwise in connection with a particular instance, in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
training respective neural networks to obtain a first model, a second model, and a third model, the first model generating an embedding for a member of an online service based on member information, the second model generating a first parameter for a distribution function and the third model generating a second parameter for the distribution function, at least one of the second model and the third model trained on training data including notification timestamps, member visit timestamps, and a censor bit set, for each respective notification, to indicate whether the notification comprises an un-censored notification or a right-censored notification, thereby enabling the at least one of the second model and the third model to eliminate a bias in time-to-visit expectations for right-censored notifications;
accessing a notification for a first member;
calculating, by the first model, a first member embedding;
calculating, by the second model, a first parameter value based on the first member embedding;
calculating, by the third model, a second parameter value based on the first member embedding;
determining, based on the first parameter value and the second parameter value for the distribution function, a first probability that the first member will visit the online service in response to the notification and a second probability that the first member will visit the online service without sending the notification; and
determining to send the notification to the first member based on the first probability and the second probability.

2. The method as recited in claim 1, wherein the training is based on training data with values for features comprising member profile information, member activity, notifications and visits to the online service.

3. The method as recited in claim 1, wherein the distribution function is a Weibull distribution.

4. The method as recited in claim 3, wherein the first parameter is a shape of the Weibull distribution and the second parameter is a scale of the Weibull distribution.

5. The method as recited in claim 4, wherein a loss function of the second model is based on a log of the shape of the Weibull distribution.

6. The method as recited in claim 4, wherein a loss function of the third model is based on a log of the scale of the Weibull distribution.

7. The method as recited in claim 1, wherein determining to send the notification further comprises:
calculating a difference between the first probability and the second probability; and
sending the notification when the difference is greater than a predetermined threshold value.

8. The method as recited in claim 1, further comprising:
requeuing the notification for later processing when the determination is not to send the notification.

9. The method as recited in claim 1, wherein the first and second probability are calculated for a plurality of channels comprising badge notifications, push notifications, and emails.

10. The method as recited in claim 1, wherein the embedding generated by the first model is an input for the second model and the third model.

11. A system comprising:
a memory comprising instructions; and
one or more computer processors, wherein the instructions, when executed by the one or more computer processors, cause the system to perform operations comprising:
training respective neural networks to obtain a first model, a second model, and a third model, the first model generating an embedding for a member of an online service based on member information, the second model generating a first parameter for a distribution function and the third model generating a second parameter for the distribution function, at least one of the second model and the third model trained on training data including notification timestamps, member visit timestamps, and a censor bit set, for each respective notification, to indicate whether the notification comprises an un-censored notification or a right-censored notification, thereby enabling the at least one of the second model and the third model to eliminate a bias in time-to-visit expectations for right-censored notifications;
accessing a notification for a first member;
calculating, by the first model, a first member embedding;
calculating, by the second model, a first parameter value based on the first member embedding;
calculating, by the third model, a second parameter value based on the first member embedding;
determining, based on the first parameter value and the second parameter value for the distribution function, a first probability that the first member will visit the online service in response to the notification and a second probability that the first member will visit the online service without sending the notification; and
determining to send the notification based on the first probability and the second probability.

12. The system as recited in claim 11, wherein the training is based on training data with values for features comprising member profile information, member activity, notifications and visits to the online service.

13. The system as recited in claim 11, wherein the distribution function is a Weibull distribution.

14. The system as recited in claim 13, wherein the first parameter is a shape of the Weibull distribution and the second parameter is a scale of the Weibull distribution, wherein a loss function of the second model is based on a log of the shape of the Weibull distribution, wherein a loss function of the third model is based on a log of the scale of the Weibull distribution.

15. The system as recited in claim 11, wherein determining to send the notification further comprises:
calculating a difference between the first probability and the second probability; and
sending the notification when the difference is greater than a predetermined threshold value.

16. A tangible machine-readable storage medium including instructions that, when executed by a machine, cause the machine to perform operations comprising:
training respective neural networks to obtain a first model, a second model, and a third model, the first model generating an embedding for a member of an online service based on member information, the second model generating a first parameter for a distribution function and the third model generating a second parameter for the distribution function, at least one of the second model and the third model trained on training data including notification timestamps, member visit timestamps, and a censor bit set, for each respective notification, to indicate whether the notification comprises an un-censored notification or a right-censored notification, thereby enabling the at least one of the second model and the third model to eliminate a bias in time-to-visit expectations for right-censored notifications;
accessing a notification for a first member;
calculating, by the first model, a first member embedding;
calculating, by the second model, a first parameter value based on the first member embedding;
calculating, by the third model, a second parameter value based on the first member embedding;
determining, based on the first parameter value and the second parameter value for the distribution function, a first probability that the first member will visit the online service in response to the notification and a second probability that the first member will visit the online service without sending the notification; and
determining to send the notification based on the first probability and the second probability.

17. The tangible machine-readable storage medium as recited in claim 16, wherein the training is based on training data with values for features comprising member profile information, member activity, notifications and visits to the online service.

18. The tangible machine-readable storage medium as recited in claim 16, wherein the distribution function is a Weibull distribution.

19. The tangible machine-readable storage medium as recited in claim 18, wherein the first parameter is a shape of the Weibull distribution and the second parameter is a scale of the Weibull distribution, wherein a loss function of the second model is based on a log of the shape of the Weibull distribution, wherein a loss function of the third model is based on a log of the scale of the Weibull distribution.

20. The tangible machine-readable storage medium as recited in claim 16, wherein determining to send the notification further comprises:
calculating a difference between the first probability and the second probability; and
sending the notification when the difference is greater than a predetermined threshold value.

* * * * *